United States Patent
Edvy

(10) Patent No.: US 11,130,072 B2
(45) Date of Patent: Sep. 28, 2021

(54) REACTIVE STILL AND METHODS OF USING

(71) Applicant: Qisus Knowledge and Technology Ltd., Moshav Dishon (IL)

(72) Inventor: Matan Edvy, Moshav Dishon (IL)

(73) Assignee: VERSTILL DISTILLATION SYSTEMS, LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/231,881

(22) Filed: Dec. 24, 2018

(65) Prior Publication Data

US 2019/0143243 A1    May 16, 2019

Related U.S. Application Data

(63) Continuation-in-part of application No. 15/759,010, filed as application No. PCT/IL2016/051007 on Sep. 11, 2016, now abandoned.

(Continued)

(51) Int. Cl.

| | |
|---|---|
| *C12H 6/02* | (2019.01) |
| *B01D 3/02* | (2006.01) |
| *B01D 3/00* | (2006.01) |

(52) U.S. Cl.
CPC ............. *B01D 3/02* (2013.01); *B01D 3/003* (2013.01); *B01D 3/009* (2013.01); *C12H 6/02* (2019.02)

(58) Field of Classification Search
CPC ........ B01D 3/001; B01D 3/002; B01D 3/003; B01D 3/004; B01D 3/005; B01D 3/02;
(Continued)

(56) References Cited

U.S. PATENT DOCUMENTS

| | | |
|---|---|---|
| 2,272,609 A | 2/1942 | Kennedy et al. |
| 2,363,973 A | 11/1944 | Kennedy et al. |

(Continued)

FOREIGN PATENT DOCUMENTS

| | | |
|---|---|---|
| CN | 204589139 U | 8/2015 |
| DE | 10118676 A1 | 11/2002 |

(Continued)

OTHER PUBLICATIONS

YouTube video titled "Distilling Alcohol & Spirits at Home with a Copper Artisan Still", Uploaded by user "realbrewing" on Jun. 12, 2012, available online at (https://www.youtube.com/watch?v=ZWO00tD7aUU), screencap taken on Dec. 18, 2019. (Year: 2012).*

(Continued)

*Primary Examiner* — Jonathan Luke Pilcher
(74) *Attorney, Agent, or Firm* — Wiggin and Dana LLP; Gregory S. Rosenblatt; Rikesh P. Patel

(57) ABSTRACT

A method of batch distilling including providing a first substrate that upon distillation releases vapour having deleterious sulfur compounds, providing an inert still, adding the first substrate to the still, installing at least one first reactive article in the still and subsequently performing a first distillation run on the first substrate, such that the installed at least one first reactive article has a first exposed area that is exposed to the distillate, and collecting a first desired fraction from the first run. The distillation during the collection of the first desired fraction is performed at a rate of less than 5 L/(hr*m2) of collected first fraction per first exposed area. Compatible still and kit are also provided.

8 Claims, 8 Drawing Sheets

Related U.S. Application Data

(60) Provisional application No. 62/217,590, filed on Sep. 11, 2015.

(58) Field of Classification Search
CPC ........ B01D 53/34; B01D 53/46; B01D 53/48; B01D 53/485; B01D 53/50; B01D 53/501; B01D 53/502; B01D 53/504; B01D 53/505; B01D 53/507; B01D 53/508; B01D 5/006; B01D 5/0063; C12H 6/02
USPC ..................................................... 202/233
See application file for complete search history.

(56) References Cited

U.S. PATENT DOCUMENTS

| | | | |
|---|---|---|---|
| 5,458,739 | A | 10/1995 | Boucher et al. |
| 6,109,504 | A | 8/2000 | Groll |
| 7,097,064 | B2 | 8/2006 | Cheng et al. |
| 7,216,413 | B2 | 5/2007 | Cheng et al. |
| 7,527,710 | B2 | 5/2009 | Pineau |
| 2005/0227341 | A1 | 10/2005 | Pineau |
| 2006/0289487 | A1 | 12/2006 | Tarenga |
| 2011/0049163 | A1 | 3/2011 | Perry |

FOREIGN PATENT DOCUMENTS

| | | |
|---|---|---|
| EP | 0343260 A1 | 11/1989 |
| GB | 419436 A | 11/1934 |
| JP | 59166077 A | 9/1984 |
| WO | 9102048 A1 | 2/1991 |

OTHER PUBLICATIONS

Barley and Hops Brewing. (Aug. 11, 2015). Running the Mighty Mini reflux still [video], YouTube, https://www.youtube.com/watch ?v=aWagmH_KBIA (Year: 2015).*

Barley and Hops Brewing. (Aug. 11, 2015). Introducing the Mighty Mini Dual purpose reflux still [video], YouTube, https://www.youtube.com/watch?v=WMqYoYDXKpo (Year: 2015).*

Distillery Trail. (Apr. 22, 2015). Why Are Stills Made of Copper? Distillery Trail, https://www.distillerytrail.com/blog/why-are-stills-made-of-copper/ (Year: 2015).*

Barley and Hops Brewing. (Aug. 1, 2015). Copper VS Stainless steel in distilling [video], YouTube, https://www.youtube.com/watch?v=4UFfanknSwY (Year: 2015).*

Garcia-Llobodanin, Laura et al., The lack of reproducibility of different distillation techniques and its impact on pear spirit composition, International Journal of Food Science & Technology, May 31, 2011.

Spaho, Nermina, Distillation Techniques in the Fruit Spirits Production, 2017.

Springbank Whisky School 2018.

Harrison, Barry, et al., The Impact of Copper in Different Parts of Malt Whisky Pot Stills on New Make Spirit Composition and Aroma, Journal of the Institute of Brewing, 2011.

Harrison, Barry et al.: "The impact of copper in different parts of malt whisky pot stills on new spirit composition and aroma", Journal of the Institute of Brewing, vol. 117.1, 2011, pp. 106-112, XP055366576 (7 pages).

\* cited by examiner

REACTIVE STILL AND METHODS OF USING

CROSS-REFERENCE TO RELATED APPLICATIONS

This application claims the benefit of U.S. Provisional Application Ser. No. 62/217,590 filed Sep. 11, 2015, and U.S. patent application Ser. No. 15/759,010, filed Mar. 9, 2018, which is the National Stage of International Application No. PCT/IL2016/051007, filed Sep. 11, 2016, each of which are incorporated by reference herein.

BACKGROUND

Distillation is a process of separating component substances from a liquid mixture by selective evaporation and condensation. Distillation may result in essentially complete separation, or it may be a partial separation that increases the concentration of selected components of the mixture. In either case the process exploits differences in the volatility of the mixture's components.

Distillation has many applications. For example, in the fossil fuel industry distillation is a major class of operation in obtaining materials from crude oil for fuels and for chemical feedstocks; in the field of industrial chemistry, large ranges of crude liquid chemical synthesis products are distilled to separate them, either from each other, or from impurities, or from unreacted starting materials.

In the field of alcoholic beverage production distillation is usually done in a pot still which usually comprises: a pot, also referred to as a boiling chamber, where the content is heated; a condenser, usually comprising tubes or others components which are cooled and thus cause the vapors to condensate, and a neck and lyne arm which transfer the vapors from the pot still to the condenser. The condensed liquid may then be withdrawn for bottling or further processing or consumption.

Distillation is a major step in producing beverages such as: whiskey or gin from wash made of cereal grains wash; brandy from wine; rum from sugarcane fermented juice, and other beverages.

When distilling a beverage, the process may require a reaction with the raw material in the gas or liquid phase. In whisky, modifying the content of sulfur-containing compounds in the distillate is required. Therefore the whisky is typically distilled in copper stills as the copper is capable of allowing such modification.

However, distinct raw materials and added reactants leave aftertastes and residual odors bound to the copper components when moving from one beverage production to another, thus forcing manufacturers to have a separate still for different beverages such as gin and whisky, or to conduct a 12 to 48 hours cleaning process that might require heating or water distillation. Another shortcoming of making the stills completely from copper is copper corrosion, and difficulty of cleaning compared to stainless steel stills (WO2014199252), and the possibility that the copper may not be effective in some components of the still as compared to other components, or may even promote the increase of sulfur-containing compounds (Barry Harrison et al., J. Inst. Brew. 117(1), pp. 106-112, 2011). There is some concern that copper oxide can carry over to the end product, see WO1991002048, and that the copper can promote release of nitrogenous copper compounds, see WO2014199252.

The invention described herein is intended to efficiently solve the versatility limitation problem of pot stills.

Another intention is to effectively and/or efficiently allow changing a still's distillate content.

Another object is to allow producing different batches of a beverage or various beverages in a still, in quick succession by minimizing the time in-between the productions.

Yet another intention is to facilitate thorough cleaning of components in a still that undergo contact with the wash or the distillate. Yet another is to provide a still that together with added, removed and/or replaced components is capable of modifying the sulfur content of distillates to desirable contents and is also protected from corrosion.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

The term "wash", referred to in the description is of the raw material to be distilled in a still to make a beverage: such as cereal grains fermented wort in whiskey or gin, or wine when making brandy, sugarcane fermented juice when rum is made and so on.

Throughout the description the term "reactive" and "inert" recur. The term "reactive", as a rule used in conjunction with a material or an article in/added to a still, refers to ability of the respective material or article to interact in operating stills with sulfur-containing compounds known to be deleterious, such as DMTS (dimethyl trisulfide) originating in whisky wash, or other compounds in other substrates, such as compounds originating from bisulfite added to wine, the material or article typically serving in the still to substantially reduce the known sulfur compounds from the still's wash distillate; and the inert material or article having an appreciably lower or no interaction with the same known deleterious sulfur-containing compounds in the washes and thus not serving to remove these compounds from the still's wash distillate.

The present invention relates to stills that include inert parts or components. Reactive articles may be added to these stills in order to reduce the levels of deleterious sulfur compounds (such as DMTS) in the distillate. These articles, or some of several articles, may be affixed to the still and thus may be considered as parts or components of the still. However, in general the articles are engageable with the still but are removable, i.e. it is easy to install and removal them from the still in between batch distillations. The still and the removable articles may be referred to together as a kit. However, as a rule, a still with such removable articles may be considered as a "still comprising one or more article".

According to one aspect, a method of batch distilling is provided comprising:

providing a first substrate that upon distillation releases vapours comprising deleterious sulfur compounds;

providing an inert still;

adding the first substrate to the still;

installing at least one first reactive article in the still, and subsequently performing a first distillation run on the first substrate, such that the installed at least one first article has a first exposed area that is exposed to the distillate;

collecting a first desired fraction from the first run;
wherein the distillation during the collection of the first desired fraction is performed at a rate of less than 5 L/(hr*m$^2$) of first-substrate per first exposed area, whereby the deleterious sulfur compounds are reduced in the collected first fraction to a desirable level.

According to another aspect, a method of batch distilling is provided comprising:

providing a first substrate that upon distillation releases vapour comprising deleterious sulfur compounds;

providing an inert still comprising a pot;

adding the first substrate to the pot;

installing at least one first reactive article in the still; and subsequently performing a distillation run on the first substrate such that the installed at least one first article has a first exposed area that is exposed to the distillate;

collecting a first desired fraction during the distillation, wherein while collecting the first desired fraction the first exposed area is at least 5.5 m$^2$ for every 1 m$^2$ of first substrate surface area in the pot.

In some preferred embodiments the still comprises a pot, a neck and a frustoconical cover connecting between the pot and the neck.

In some more preferred embodiments, the cover is a reactive article.

Preferably, essentially the entire surface of the at least one first article is exposed to vapour distilled from the first distillation run.

In some embodiments the at least one first article is electrically isolated from the still.

In some preferred embodiments the at least one first article is removably engageable with the still.

The method may further comprise:

subsequent to collecting distillate from the distillation run: disengaging the at least one first removable reactive article from the still, providing a second substrate;

adding the second substrate to the still, and subsequently performing a second distillation run on the second substrate. An advantage of the invention is realized in cleaning the at least one first removable article while performing the second distillation run.

Optionally, the second substrate upon distillation releases vapour comprising deleterious sulfur compounds;

the method further comprising:

installing at least one second reactive article in the still, and subsequently performing a distillation run on the second substrate, such that the installed at least one second article has a second exposed area that is exposed to the distillate;

collecting a second desired fraction from the second distillation run;

wherein the distillation during the collection of the second desired fraction is performed at a rate of less than 5 L/(hr*m$^2$) of first-substrate per second exposed area, whereby the deleterious sulfur compounds are reduced in the collected desired fraction to a desirable level.

Alternatively, optionally the method further comprises installing at least one second reactive article in the still;

subsequently performing a distillation run on the second substrate such that the installed at least one second article has a second exposed area that is exposed to the distillate;

collecting a second desired fraction during the distillation, wherein while collecting the second desired fraction the second exposed area is at least 5.5 m$^2$ for every 1 m$^2$ of second substrate surface area in the pot.

The inert material comprises for example stainless steel.

The reactive material may be selected from a group consisting of: copper, silver, titanium dioxide and mixtures thereof.

The deleterious sulfur compounds may comprise DMTS (for example in the distillation of whiskey).

The still typically comprises a condenser. The condenser may be inert and not engaged with a first reactive article.

The distilling may be of an alcoholic beverage.

The at least one first article may comprise a plurality of substantially parallel, horizontal plates disposed at a bottom area of the condenser and separated from the condenser by a spacer, such that a condensed distillate flows over the plates.

The at least first article may be hollow and connected to the still with a wire. The still typically comprises a neck and a lyne arm, and the at least one first article may comprise a plurality of arcuate plates separated from the neck and/or lyne arm by an inert spacer.

The arcuate plates may comprise ribs extending into the neck and/or lyne arm.

According to another aspect a kit is provided comprising:

an inert still;

at least one reactive first article releasingly engageable with the still;

wherein the kit is configured to allow collecting a desired fraction from distillation of a first substrate at a rate of less than 5 L/(hr*m2) of first-substrate per exposed area of the at least one first article.

The kit may further comprise:

at least one reactive second article releasingly engageable with the still; wherein the kit is configured to allow replacing the at least one first article with at the least one second article.

According to another aspect, a still is provided comprising:

inert components;

at least one reactive article therein, and at least one spacer situated between the reactive article and the inert components.

The at least one spacer may each comprise electrically insulating material.

The still may further comprise therein at least one rotor.

The still may further comprise a pot, wherein which in some embodiments one or more of the at least one article is surrounded with at least one spacer and is situated in the pot.

The still may further comprise a shell, wherein which there may be one or more of the at least one article which is hollow and is disposed in the shell.

In some embodiments one or more of the at least one spacer is a wire connecting one or more of the at least one article to the shell.

One or more of the at least one article is arcuate.

One or more of the at least one article comprises ribs extending into the shell.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
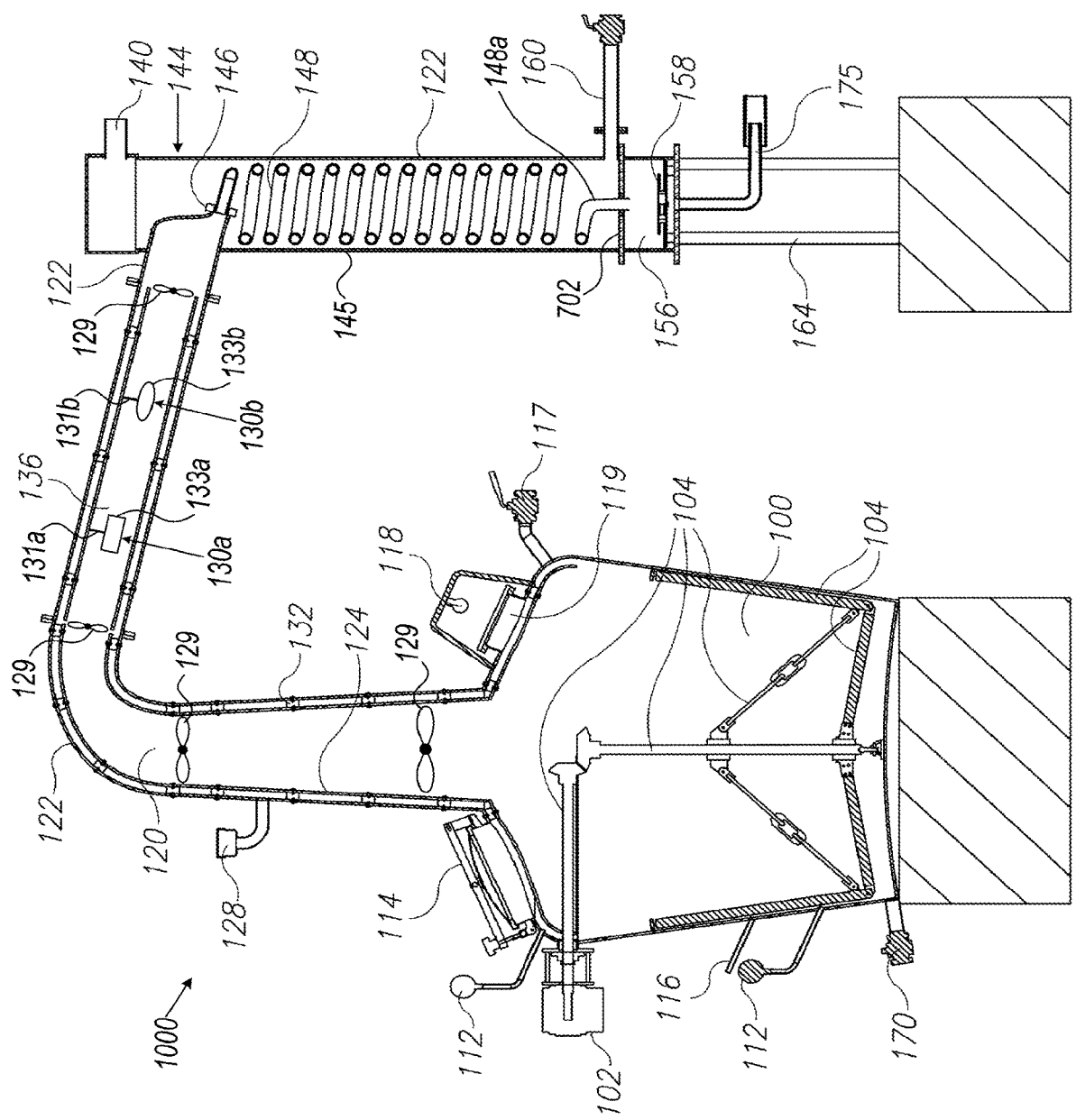
FIG. 1 is a schematic cross section of a still, in accordance with some exemplary embodiments of the disclosure.

The disclosure relates to pot still systems and to methods of employing such systems to provide high durability and multifunctionality to the stills.

Traditionally, stills for producing whiskey, brandy, ouzo and other beverages are at least partially made of a material, usually copper, that reacts with sulfur containing compounds. The use of copper is regarded as having an important effect on the distilled beverage's character, which may include its aroma and body. During distillation, the copper reacts with the volatile sulfur containing compounds in the raw material. Copper, or another material that reacts with sulfur containing compounds, is therefore an essential element in producing a clean spirit, both in regard of the chemical toxicity, and in the organoleptic attributes of the distillate.

One technical problem of copper stills or stills that contain copper is that due to this reaction and others, the still itself degrades, and can only be used for a certain number of times. Since copper is an expensive material, this has significant impact on the still's cost.

However, despite these problems and others described above, related to use of a still made entirely of copper, attempts to replace parts of the stills with corresponding inert parts have resulted in perceptibly reduced quality of the product. [Barry Harrison et al., J. Inst. Brew. 117(1), pp. 106-112, 2011].

Realizing that generally in industry distilleries will be built to maximum size in order to stay cost effective, and that once stills are installed, the potential reacting surface area will be constant, distillation flow rate will be optimized for given parameters for each location and set up. Therefore it is well known in industry that there is a need for the fastest distillation rate that yet will yield an acceptable product. Springbank Distillery claims to have the slowest distillation rate of any distillery in Scotland at 240 L/hr [Springbank Production Packet, p. 33, 2018], i.e., 8 L/(hr*$m^2$) using stills with an internal surface of 30 $m^2$ and entirely made of copper.

There is no motivation in the art to perform a significantly slower distillation rate than the minimum currently used, as such rate is not expected to yield significantly superior qualitative results with copper stills, much less with stills that are internally mostly not made of copper. Moreover, the slow production rate would discourage a skilled in the art from pursuing such production.

It is well known in industry that copper reacts with certain deleterious sulfur molecules to produce a more refined product. Previous attempts to use a stainless steel still with the addition of copper parts in varying locations have failed to achieve the same quality obtained entirely from copper stills [Barry Harrison et all, J. Inst. Brew. 117(1), pp. 106-112, 2011]. Even more so, some sulfur compounds are increased in the presence of copper and some less [ibid.]. Another factor complicating the improvement of the product is the known dependence of such quality upon myriad operational conditions

[L. Llobodanin et al., International Journal of Food Science and Technology, 2011, 46, 1956-1963], [N. Spaho, http://dx.doi.org/10.5772/66774].

The results and conditions described above all indicate that achieving with a partially-copper still the quality comparable to a complete copper still. Therefore, we were surprised to consistently obtain excellent results with our still outside accepted operational conditions.

To summarize, we have now surprisingly discovered that a still can be made of inert materials and nevertheless produce quality products superior to those reported in the prior art, in particular in respect of the content of sulfur-containing compounds. In order to achieve this quality we add to our stills articles made of reactive materials, and perform the distillation at a slow rate in relation to the total area of reactive material placed in the still.

A skilled in the art will appreciate that adverse vapour flow conditions during distillation can cause foaming, entrainment, weeping/dumping, and/or flooding and will cause inferior distillation results. Such conditions are likely to impede the quality of the distillate in respect of the content of sulfur-containing compounds and should be avoided.

We have realized that the combination of reactive and inert components has additional advantages.

According to one aspect, a kit is provided, the kit comprising an inert still and reactive articles made of a material such as copper. The still and reactive articles are configured to allow removable engagement of the reactive components with the still.

The removability solves the technical problem that since the prior art still structures are fixed, the tastes and smells of the raw material become absorbed in the still. Therefore, in order to produce beverages from different raw materials while avoiding a cross-influence of tastes and smells, multiple prior art stills are required, wherein each still has its own structure that determines the specific resulting character.

Another technical problem that is elegantly solved is that since the prior art still structure is fixed (such as regarding its internal surface area that reacts with the sulfur containing compounds), the extent of reaction between the raw material and the still has a specific range as well. Therefore, in order to produce beverages with varying levels of exposure to reactive surfaces (thus removing to various extents sulfur containing compounds), multiple prior art stills are required, wherein each still has its own structure that determines the specific resulting aroma and taste.

One particular technical solution relates to producing the main body of the still, referred to herein as the still's "shell", from non-reacting, non-degradable material such as stainless steel, polymers durable to high temperatures, ceramics, glass or the like. However, to provide reaction with the raw material and produce the required taste and odor, certain articles may be added to the still and may be made of a reactive material such as copper. For example, any one or more of the following articles can be made reactive: plates located within the pot or connected to the mixing mechanism of the pot, plates connected on the internal side of the lyne arm and/or the neck, articles provided within the condenser, an additional exposure cassette through which the liquid and or vapour passes on its way through the still, or the like.

The reactive articles may be connected to components, such as the mixing mechanism, the pot, the lyne arm and/or neck and the condenser using spacers made of inert and non-electrically conductive materials, such as polytetrafluoroethylene or a polytetrafluoroethylene based formula (collectively referred to herein as PTFE), high temperature food grade plastic, ceramic, glass, or the like, in order to avoid for example, stainless steel-copper contact which may create galvanic corrosion.

Another technical solution relates to providing still and removable or replaceable reactive articles. It will be appreciated that such removable or replaceable articles may be different structures or sizes of reactive plating that may be used for producing beverages having different levels and/or types of compounds for removal or alteration, thus controlling the distillate character. Generally, larger reactive articles, or reactive articles having larger surface area will contribute to increased reaction, especially where reflux and condensation occur, and will produce beverages of lighter body, and less sulfur-related aroma.

In some exemplary embodiments, the reactive articles may be removable, such that when it is required to produce a beverage with a specific level of reactive exposure, one or more reactive articles corresponding to the required level may be inserted or installed within the still. When it is required to produce beverage with a different level, the reactive articles may be removed and different reactive articles may be inserted and/or more or less articles may be inserted. Thus, a single still with a multiplicity of reactive structures may be used for producing beverage batches of various characters.

FIG. 1 shows a schematic illustration of a still 1000, whose shell 122 may be made of an inert material such as stainless steel, and one or more articles made of a reactive material.

The still 1000 comprises a pot 100, which may be made of stainless steel or another inert material. The still 1000 may further comprise a motor 102 connected to a mixing mechanism 104, for mixing a fluid such as wash within the pot 100. The mixing mechanism 104 may be made of a reactive or inert material, and may comprise a substantially round, although not necessarily planar, plate made of reactive or inert material. It will be appreciated that among other roles, rotation of the mixing mechanism 104 increases the reaction between the fluid and the reactive articles (if there are any) that come into direct contact with the wash, and thus has greater effect upon the sulfur related aroma of the produced beverage. It will also be appreciated that any other reactive plates or articles, whether related to the mixing mechanism or not, may be placed within the pot 100. Such articles may be effective in spirit stills and/or wash stills in whiskey preparation [Barry Harrison et al., J. Inst. Brew. 117(1), pp. 106-112, 2011]. In other embodiments there is no mixing mechanism.

The still 1000 further comprises one or more mechanical temperature sensors 112 or electrical temperature sensors 116, a charging line or valve 117 intended to charge the raw material into the still 1000, and a flashlight 118 or window 119 for examining the contents of the pot 100. These components 116, 117, 118, 119 are optional in other embodiments.

The still 1000 further comprises a discharge valve or line 170 intended to allow discharge of the residue material after the distillation process is completed. Other embodiments have the same or similar components.

The still 1000 also comprises a door or hatch 114 allowing a user such as an operator to get into the still 1000 for technical inspection, required maintenance, or cleaning. Other embodiments have the same or similar components. Yet other embodiments do not have a door or hatch.

The vapors created by heating the fluid within the pot 100 go through a
neck 120 and a lyne arm 136 formed by the shell 122, and into a condenser 144.

The neck 120 and lyne arm 136 may have therein one or more internal reactive plates 124, as further detailed in association with FIGS. 2-6 below. Additionally, hollow reactive articles 130a, 130b are installed. The hollow articles 130a, 130b comprise a rectangular frame 133a or a ring 133b, respectively, suspended from the lyne arm 136 by an inert wire 131a, 131b, respectively. Some embodiments comprise the plates only, and other embodiments comprise the hollow articles only. Yet other embodiments comprise other reactive articles.

The still 1000 further contains rotors 129. The rotors 129 may be powered to rotate by a motor; alternatively, the rotors are turbines powered by the kinetic energy of the vapour. The rotors 129 may be reactive or inert. They may serve to increase the interaction of the vapour with the reactive articles and/or to prolong the distillation, by either slowing or diverting the unreacted vapour, and thus are preferably positioned adjacent and upstream of the articles, or by increasing the removal of reacted vapour, and thus are preferably positioned adjacent and downstream of the articles. Other embodiments do not comprise rotors.

The neck 120 depicted in FIG. 1 may be connected to an anti-collapse
valve 128 configured to prevent the buildup of excessively low gas pressure within the still 1000.

The condenser 144, as further discussed in paragraphs below, comprises a casing 145 and a worm 148a therein, to which the distilled vapour is conveyed from the lyne arm 136. The condenser 144 further comprises a cooling water jacket 140, through which cooling water passes to an outlet 160. The cooling jacket 140 allows heat transfer from the worm 148a to cooling water, so that condensation occurs in the worm 148a. The condenser 144 may be placed on legs 164. In some embodiments the condenser 144 and the above-mentioned components such as pot 100, lyne arm 136 and other components may be made of stainless steel or another durable material that is inert. In some embodiments no reactive articles are installed in the condenser. Although placement of a reactive article in the condenser has previously been found to have a considerable weight in improving the quality of the distillate, compared to placement in other places in the still [Barry Harrison et al., J. Inst. Brew. 117(1), pp. 106-112, 2011], according to the present invention such placement is less crucial since the distillation rate has been found to be a more important factor in determining the quality of the distillate in inert stills with added reactive articles.

In other embodiments the worm 148 comprises a reactive material, thus providing exposure to the condensate and controlling the character of the distillate.

If the worm 148 is indeed made of a reactive material, then a spacer 146 may be used for separating the lyne arm 136 from the worm 148, and another spacer 702 may be used for separating the casing 145 from the worm 148. The spacers 146 and 702 are preferably made of an electrically insulating and high-temperature material such as PTFE, high temperature food grade plastic, ceramics or the like. By "high-temperature" the meaning is that the material is not degraded at distillation temperatures.

The condenser 144 further comprises a reactive enhancement compartment 156 through which the distillate flows before being output from a distillate output line 175. The compartment 156 may further contain reactive articles as will be further detailed below.

In some embodiments (not shown) at least one reactive article is situated in the pot and hangs therein from an inner upper portion of the pot, or is buoyant such as to float in a wash. Due to the turbulence from the heated wash the article is preferably surrounded with an inert spacer. The article may be in the form of a sphere, a tubular ring, a disc, saucer-shaped or the like, preferably having large internal surface area such as a mesh, with a perforated outer surface for allowing a throughput of a large amount of liquid, with for example an inert external coating isolating the reactive material from the non-reactive inner surface of the pot. The floating or immersed reactive member may be loosely bustling in the turbulent liquid for increasing exposure of the reactive internal surface area to the liquid.

Other embodiments comprise alternative components that comprise or do not comprise reactive articles.

Figure 2:
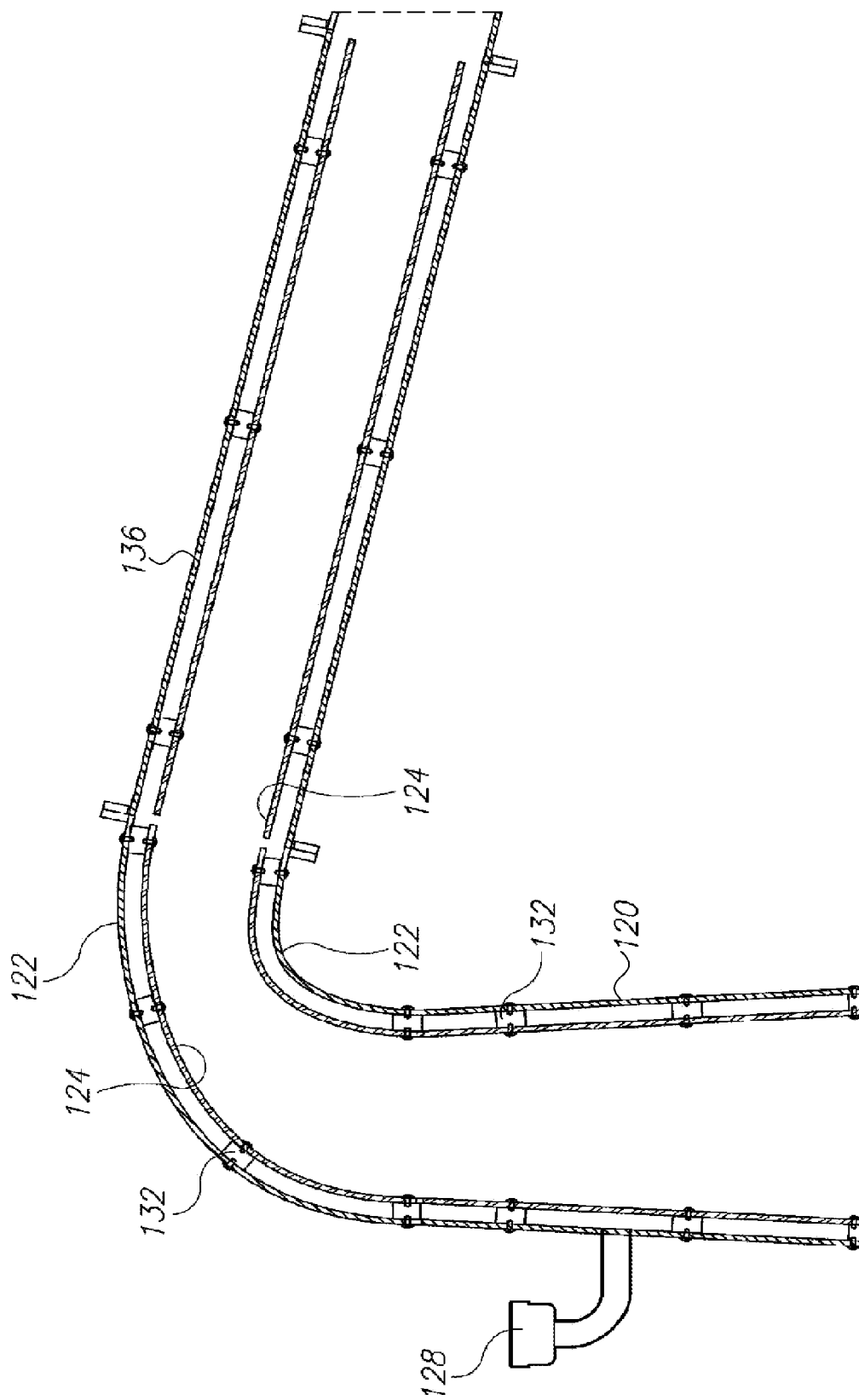
FIG. 2 is an expanded view of a neck and a lyne arm in the still shown in FIG. 1, in accordance with some exemplary embodiments of the disclosure.

FIG. 2 shows an expanded view of the neck 120 and the lyne arm 136, which contain internal reactive plates 124 capable of reacting with the raw material vapor. The reactive plates 124 are separated by one or more spacers 132 from the neck 120 and lyne arm 136. The spacers 132 may be made of an electrically insulating high temperature resistant material such as PTFE, high temperature food grade plastic, ceramics or the like.

Figure 3:
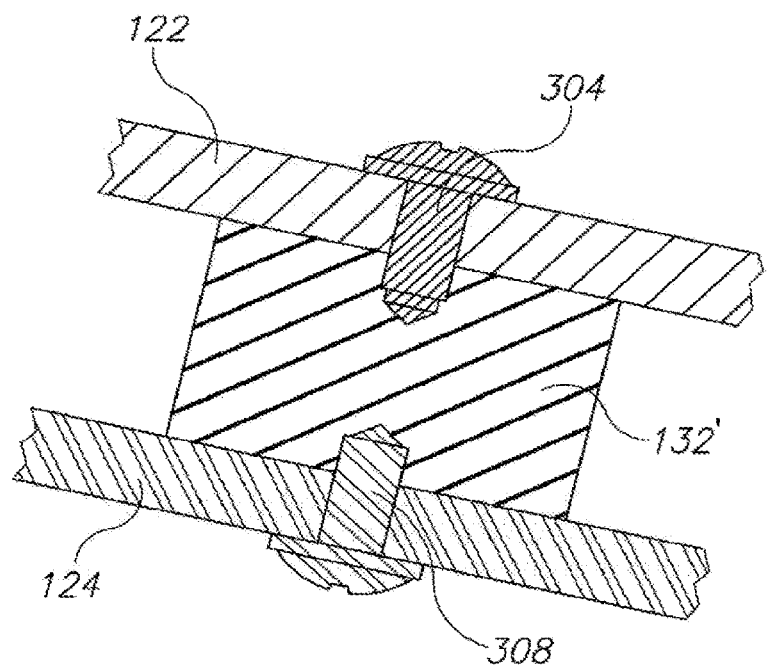
FIG. 3 depicts a portion of a reactive article and a portion of an inert shell of the still, physically separated by a spacer, according some embodiments.
Figure 4:
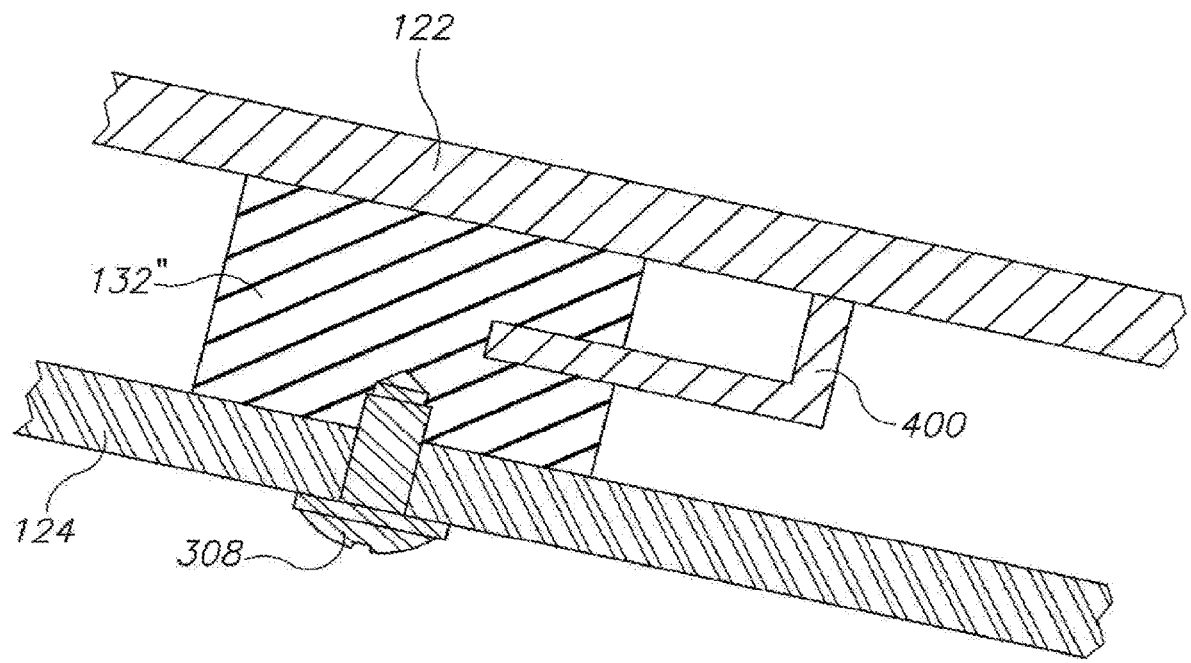
FIG. 4 illustrates a portion of a reactive article and a portion of an inert shell of the still, physically separated by another spacer, according some other embodiments.

FIGS. 3 and 4 show embodiments connecting and spacing internal reactive plates 124 to a shell 122 which may comprise a neck and a lyne arm of a still. However, the discussion below refers mutatis mudandis to the spacers 146 and spacer 702 or any other spacer for separating a reactive article from an inert component. The spacer 132' may be a rigid or semi-rigid piece designed to separate the shell 122 from a reactive plate 124. The two components 122, 124 should be well separated, since contact therebetween may cause galvanic corrosion and thus degrade either one or both and harm the durability of the still 1000. It will be appreciated that the spacer 132' should connect to each of the components 122, 124 without causing damage to either the spacer 132' or the components 122, 124 it connects to. Thus, each spacer 132' may connect to the shell 122 by at least one external shell bolt 304 or screw made for example of material that does not react with the material the shell 122 is made of, for example the bolt 304 may have an electrical potential close to or identical with the electrical potential of the shell 122 to minimize a galvanic reaction therebetween, or may be made of an electrically insulating material. Alternatively, the bolt 304 may be a sacrificial anode. The bolt is preferably made from a high-temperature material. The spacer 132' may connect to reactive plate 124 by a screw 308 or bolt made of a high-temperature material that does not damage the reactive plate 124. For example, in the case that the plate 124 is made of copper, the screw 308 may be made of copper or brass.

As shown in FIG. 4, a spacer 132" may connect to the shell 122 by a spacer holding arm 400. The spacer holding arm 400 may have an "L" shaped cross section, wherein one arm of the "L" shape is partially inserted into the spacer 132". The arm 400 may be made of the same material as the shell 122, such as stainless steel, or any other material that does not react with the material of the shell 122.

Figure 5:
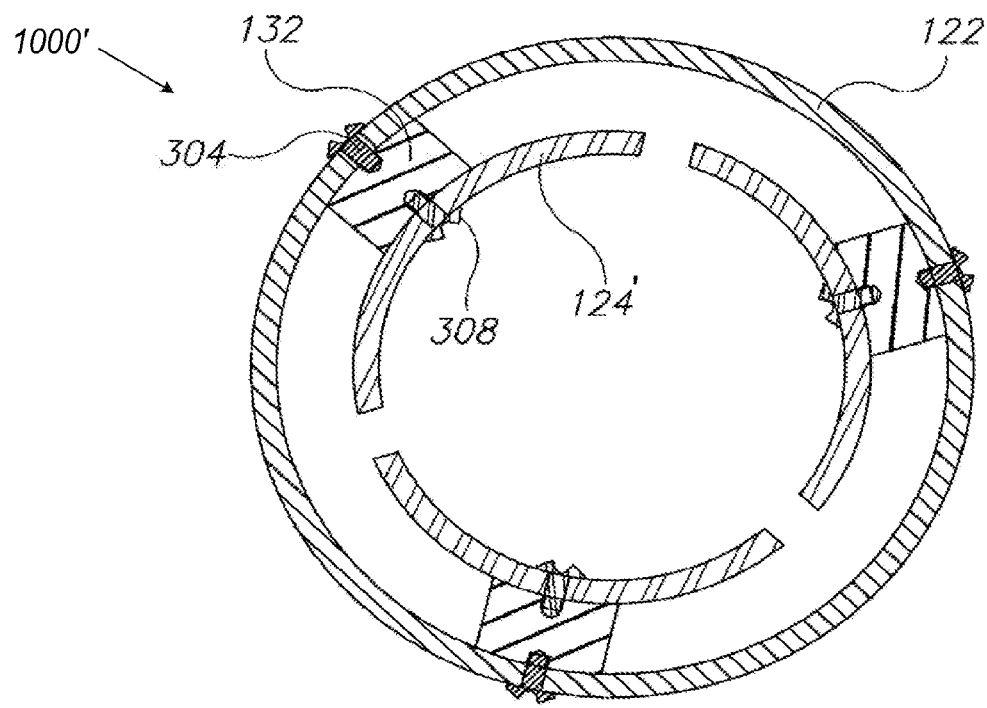
FIG. 5 illustrates a cross section of an embodiment of an inert shell and a reactive plate of a still neck and lyne arm, in accordance with some exemplary embodiments of the disclosure.
Figure 6:
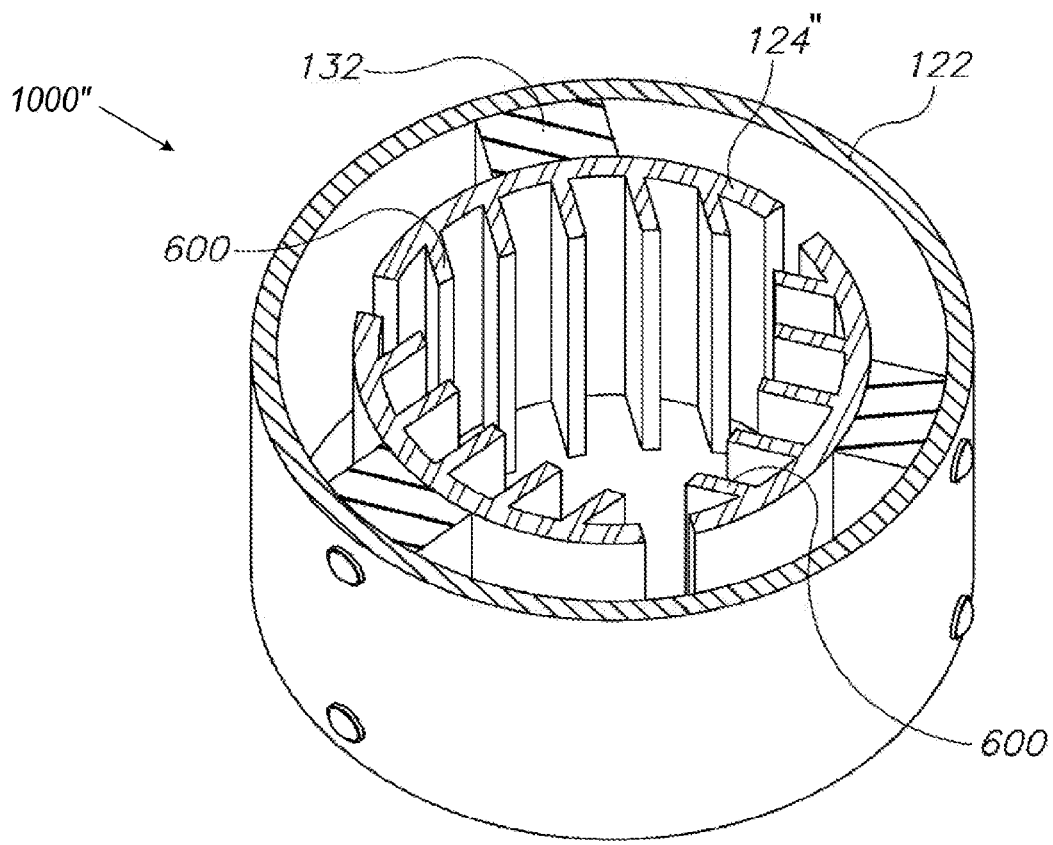
FIG. 6 is an illustration of a cross section of other embodiments of a shell and reactive plate, in accordance with some other exemplary embodiments of the disclosure.

We refer now to FIGS. 5 and 6, showing cross sections of a shell and reactive plates in other still embodiments 1000', 1000". In the embodiment 1000' shown in FIG. 5, reactive plates 124' may have a cross section shaped as arcuate segments, such that when the vapors flow through the shell 122 they react with all sides of the reactive plates 124' and their flow is essentially laminar (minimal dead volumes).

In the embodiment 1000" shown in FIG. 6, each reactive plate 124" is generally shaped as an arcuate element, but the plate 124" further comprises reactive ribs 600 that extend into the shell 122 and that serve to further increase the surface area available for reaction with the vapors passing within the shell 122.

The reactive plates may be removed and installed via hatches in the shell, pot lyne arm, neck and/or condenser (not shown). In some preferred embodiments reactive plates are placed in particular at or near junctures and bends, such as between the neck and the lyne arm, and between the lyne arm and the condenser.

Figure 7:
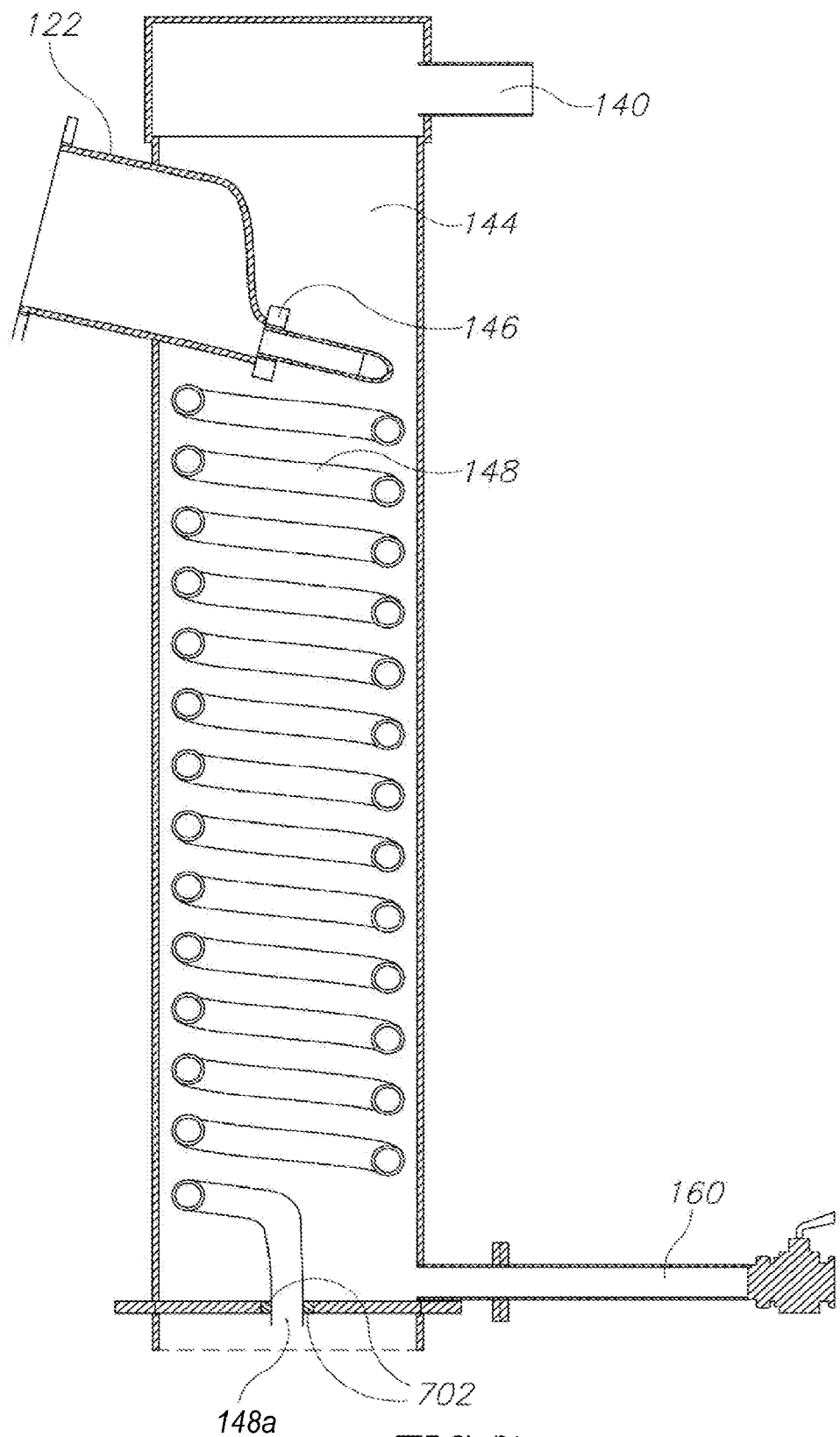
FIG. 7 illustrates a longitudinal section of an embodiment of a condenser of a still with reactive articles, in accordance with some exemplary embodiments of the disclosure.
Figure 8:
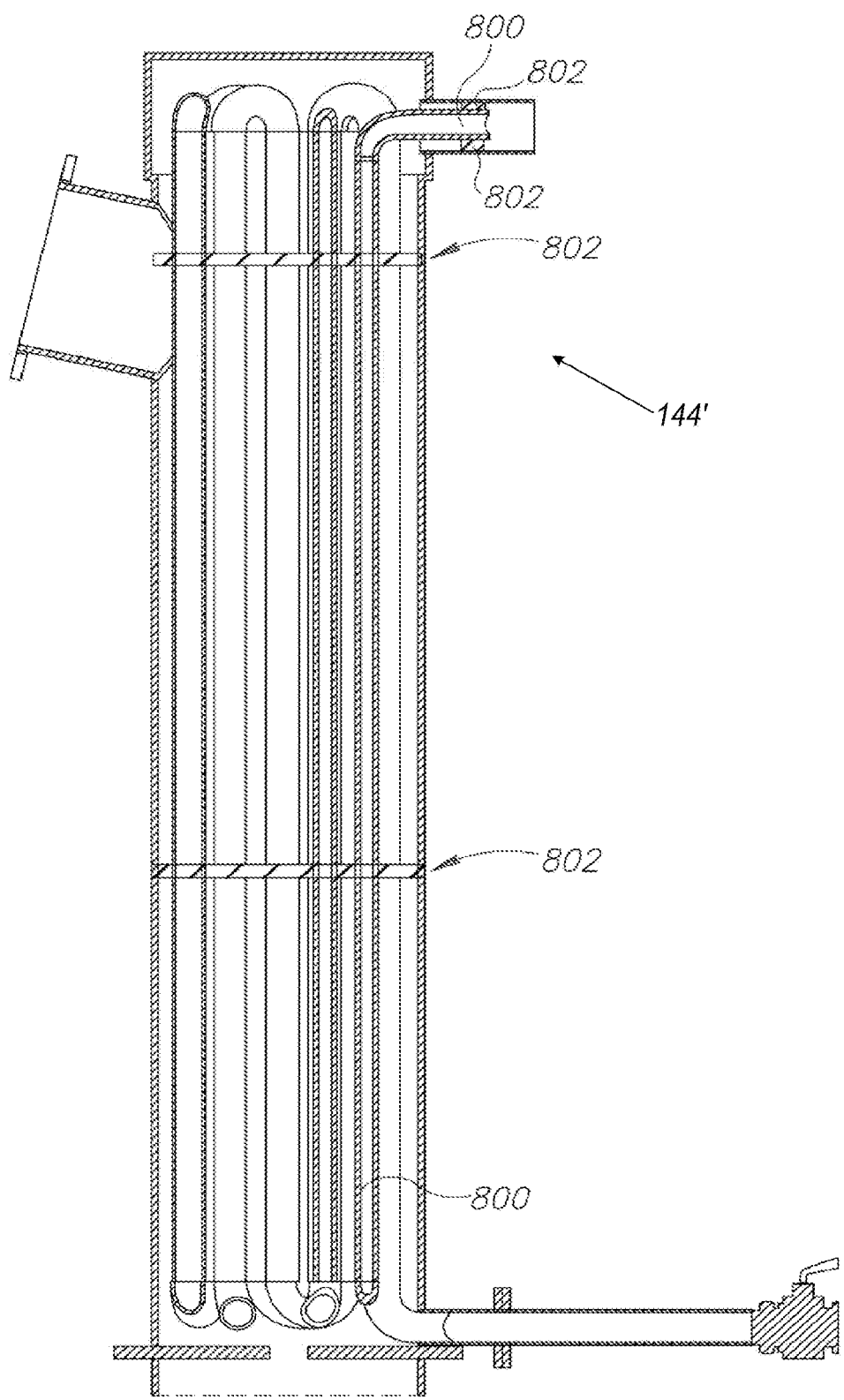
FIG. 8 is an illustration of a longitudinal section of other embodiments of a condenser of a still with reactive articles, in accordance with some other exemplary embodiments of the disclosure.

FIG. 7 shows an expanded view of the cross section of the condenser 144. The worm 148 may be formed as a spiral going from the top to the bottom of condenser 144 or to the distillate outlet 148a, from which the distillate is drawn from the still 1000, or to a compartment 156 (FIG. 1) FIG. 8 shows an alternative condenser 144'. The condenser 144' comprises an alternative cooling article 800 to the worm, for reacting with the distillate vapors. In contrast to the embodiment shown in FIG. 7, here the distillate flows outside of the article 800, and the cooling fluid flows inside the article 800. The article 800 may be made of a reactive material, such that vapors condensate over its outer, cool surface and also react with it. One or more spacers 802, which are made of an electorally insulating and high temperature material such as PTFE, high temperature food grade plastic, ceramics or the like, may connect the cooling article 800 to the inert shell of the condenser.

Figure 9:
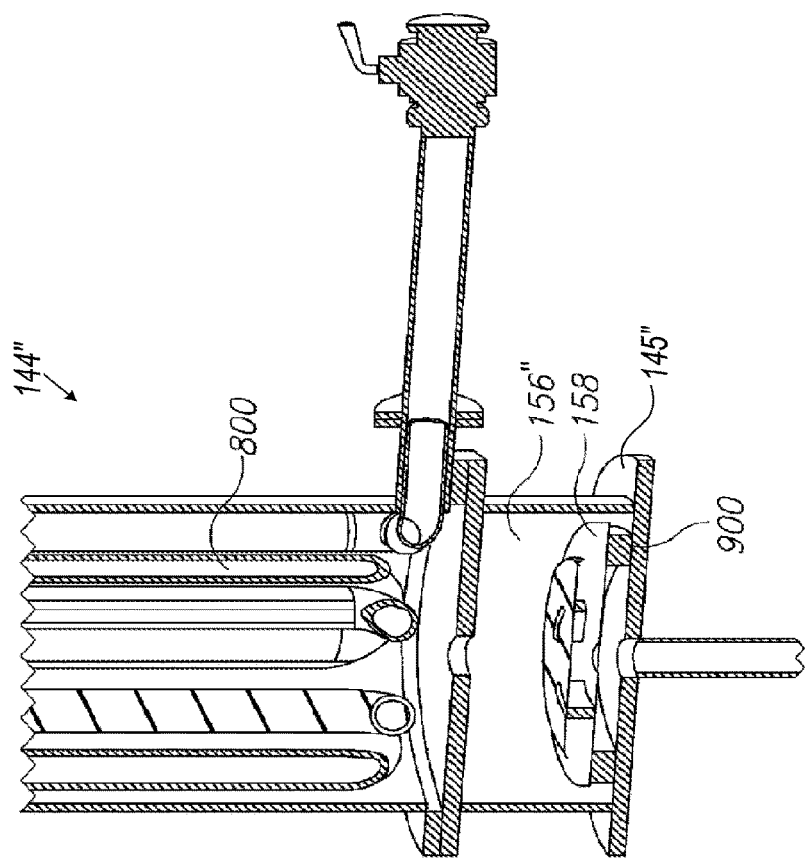
FIG. 9 is an expanded view of a reactive exposure enhancement compartment of a still such as shown in FIG. 1, in accordance with some exemplary embodiments of the disclosure.

It will be appreciated that the article 800 or worm tube 148 are merely examples, and a reactive article of any other shape may be used within condenser 144 to react with the distillate. FIG. 9 depicts an expanded view of a reactive exposure enhancement compartment 156" in a condenser 144". The compartment 156" comprises therein one or more plates 158 or other elements made of reactive material, copper for example. The distillate, after being condensed in the condenser (not shown) may drip into the compartment 156", and react with the reactive elements 158. In some embodiments (not shown), the elements may be shaped as stacked plates with spacers there between. In some embodiments, a higher plate has a larger diameter than a lower plate has, in order to direct the flow of the distillate, and enhance the exposure of the distillate to reactive material.

The lower elements 158 may be separated from the casing 145", which may be made of stainless steel, by spacers 900 which may also be made of high-temperature and electrically insulating material such as PTFE, high temperature food grade plastic, ceramics or the like, in order to prevent reaction between the reactive material and the stainless steel.

It will be appreciated that any one or more of the various articles that may be made of a reactive material, such as mixing mechanism 104, plates 124, worm 148, articles 800 or plates 158 may be used or omitted according to need. If it is required to produce a distillate with a highly reactive exposure, then more articles may be used, or articles with larger surface area will be used, and vice versa.

In some embodiments, each of the mentioned reactive articles may be removable, such that a prior to starting a batch, the articles required for the specific aroma are installed within the pot or the condenser.

Figure 10:
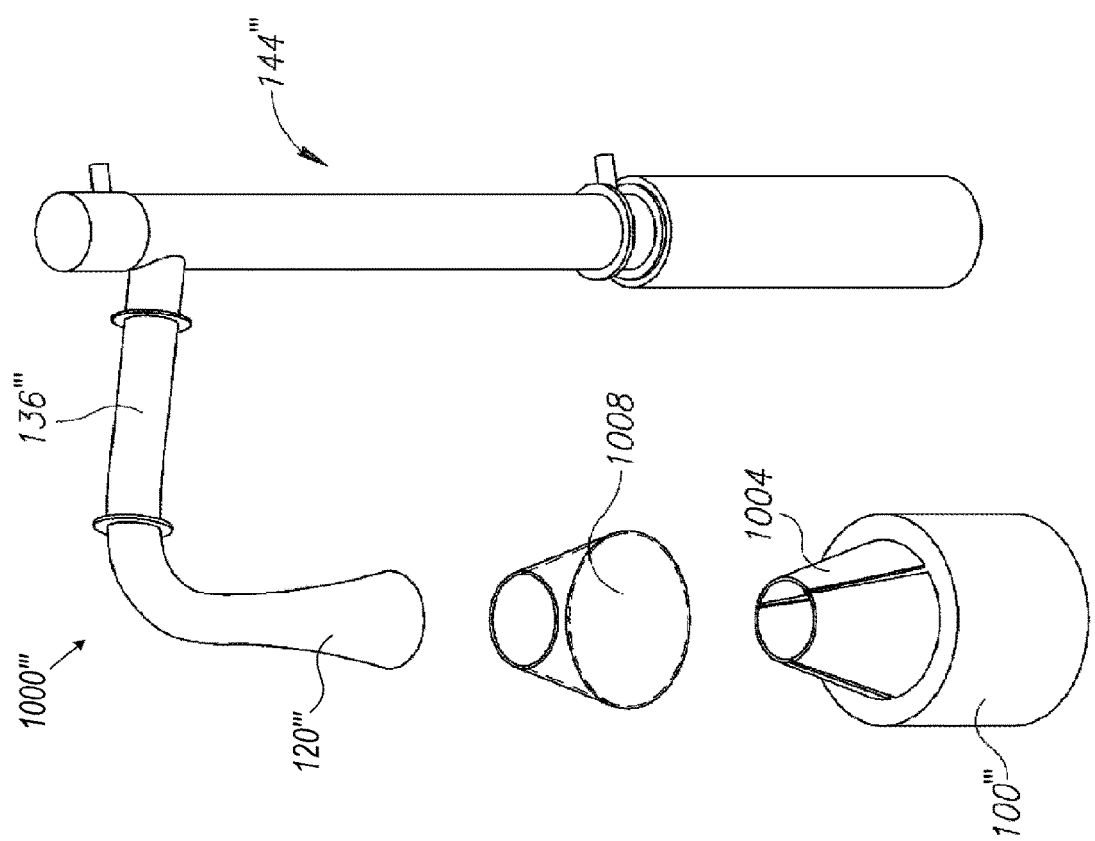
FIG. 10 is an illustration of a still with removable reactive articles, in accordance with some exemplary embodiments of the disclosure.

FIG. 10 presents a still 1000''' with removable reactive articles. The still 1000''' comprises a pot 100''', and a removable reactive subsystem 1004, which is placed on an electrically isolating component (not visible) of the pot 100''' if required (in some other embodiments there is no appreciable galvanic reaction between the subsystem and the pot). The removable reactive subsystem 1004 may comprise plates such as the substantially-cylindrical structure 124 of FIG. 2, or any other plates that are placed within formerly described pot 100, Neck 120, lyne arm 136 and condenser 144. The still 1000''' further comprises a frustoconical cover 1008 of the pot 100''', which may be isolated from the removable reactive subsystem 1004, for example by high-temperature electrically isolating spacers.

The still 1000''' also comprises a neck 120''' and a lyne arm 136''', for connecting the pot 100''' to a condenser''' 144.

Experiments were conducted on this still 1000''' with the cover 1008 and the reactive subsystem which is a frusto-conical structure as well.

Example 1

Samples within the parameters of current embodiments and outside said commercially applied parameters were prepared from malted barley wash. The distillation was carried out with the condenser controlled at 20±2° C. and at ambient temperature. Distilled new make samples were evaluated by whisky industry experts, and were sent to Scotland for evaluation by Harriot Watt University Sensory Analysis Lab, who found the samples to have "a good spirit with a nice cereal character"; "It is not bland (which would be a negative), and it has plenty of positive characteristics. There were no detectable defects."

Example 2

Samples within the parameters of current embodiments and outside said commercially applied parameters were prepared from wine wash. The distillation was carried out with the condenser controlled at 20±2° C. and at ambient temperature, several months after the preparation described in Example 1. The following samples were organoleptically evaluated by Sommeliers and Mixology Teams (from one of the top 50 bars in the world by "Drinks International" as well as a Winner of the World Class Competition by blind tasting):

1. Samples prepared at roughly 8 L/(Hr*$m^2$) of distilled spirit per exposed area or less than 5.5 m2 of reacting area per 1 $m^2$ of substrate surface area were described as "Sulfury, acrylic, heavy, oily, pungent, some offensive aromas, bad aftertaste."

2. Samples prepared within the procedures specified in the current embodiment (less than 5 L/(Hr*$m^2$) of distilled spirit per exposed area, i.e., 4 L/(Hr*$m^2$), or more than 5.5 $m^2$ of reacting area per 1 $m^2$ of substrate surface area) were described as "Similar to known popular spirits, pleasant, fruity aromas, balanced, and light bodied."

3. Control samples which were prepared in an inert still with no addition of reacting materials and distilled at 6 L/(Hr*$m^2$) were described as "raw, highly phenolic, offensive, harsh, unbalanced."

The difference in results obtained above (option 1) said rate and below (option 2) the rate is surprisingly profound.

According to another aspect a method of operating a still is provided, the method comprising:

providing a first substrate that upon distillation releases vapour comprising deleterious sulfur compounds;

providing an inert still;

adding the first substrate to the still;

installing at least one first reactive article in the still, and subsequently performing a first spirit run on the first substrate, such that the installed at least one first article has a first exposed area that is exposed to the distillate;

collecting hearts from the first sprit run;

wherein the distillation is performed at a rate of less than 5 L/(hr*m2) of collected hearts per first exposed area, whereby the deleterious sulfur compounds are reduced in collected hearts to a desirable level.

According to yet another aspect another method is provided, the method comprising:

providing a first substrate that upon distillation releases vapour comprising deleterious sulfur compounds;

providing an inert still comprising a pot;

adding the first substrate to the pot;

installing at least one first reactive article in the still; and subsequently performing a distillation run on the first substrate such that the installed at least one first article has a first exposed area that is exposed to the distillate;

collecting a first desired fraction during the distillation, wherein while collecting the first desired fraction the first exposed area is at least 5.5 $m^2$ for every 1 $m^2$ of first substrate surface area in the pot.

Adverse vapour flow conditions are avoided. The lyne arm may be selected such that the angle promotes slow distillation. The installation of the first articles may be performed before adding the first substrate to the still.

Preferably, as aforementioned, essentially the entire surface of the at least one first article is exposed to vapour distilled from the wash.

The reactive material may be selected from a group consisting of: copper, silver and titanium dioxide. See for example WO2014199252 regarding distillation components covered with layers of nanostructured copper comprising nanoparticles of $TiO_2$.

Experiments conducted on the still 1000''' showed between very little and negligible reaction with the condenser being reactive, and good distillation results will be obtained even when the condenser is inert and not engaged with a reactive article. According to one aspect the method comprises installing a first reactive article in an inert still;

slowly distilling a batch of a first beverage in the still; replacing the first reactive article with a second reactive article, and slowly producing a batch of second beverage in the still.

The second article can be installed at the same location that the first one article was installed, or at another location. The first and second article may be identical in structure or different.

According to another aspect, a kit is provided comprising a still and at least two reactive articles, wherein the at least two reactive articles are adapted to be removably engageable within the still.

The at least two articles may all be simultaneously engaged with the still, i.e. during one distillation run, or may serve to replace each other in between distillation runs, for example a first article is engaged; a first distillation run is performed on the still; the first article is removed after the first run ends; a second article is engaged in the still; and a second run is performed. The first article can be prepared e.g. by cleaning and inspection during the second run. After the second run the second article is removed and the first article or a third article is engaged, and so forth. Alternatively, all of the articles may be removed and a second run may be made without any engaged therein, or some of the articles may be removed for the second run, or additional articles may be engaged. The first article and the second article may be identical and installed in the same way and location in the still; or alternatively, they may have different structure, surface area, or made from different materials or essentially the same material but in different conditions (partly oxidized etc), and may be installed at different locations/ways in the still.

Figure 11:
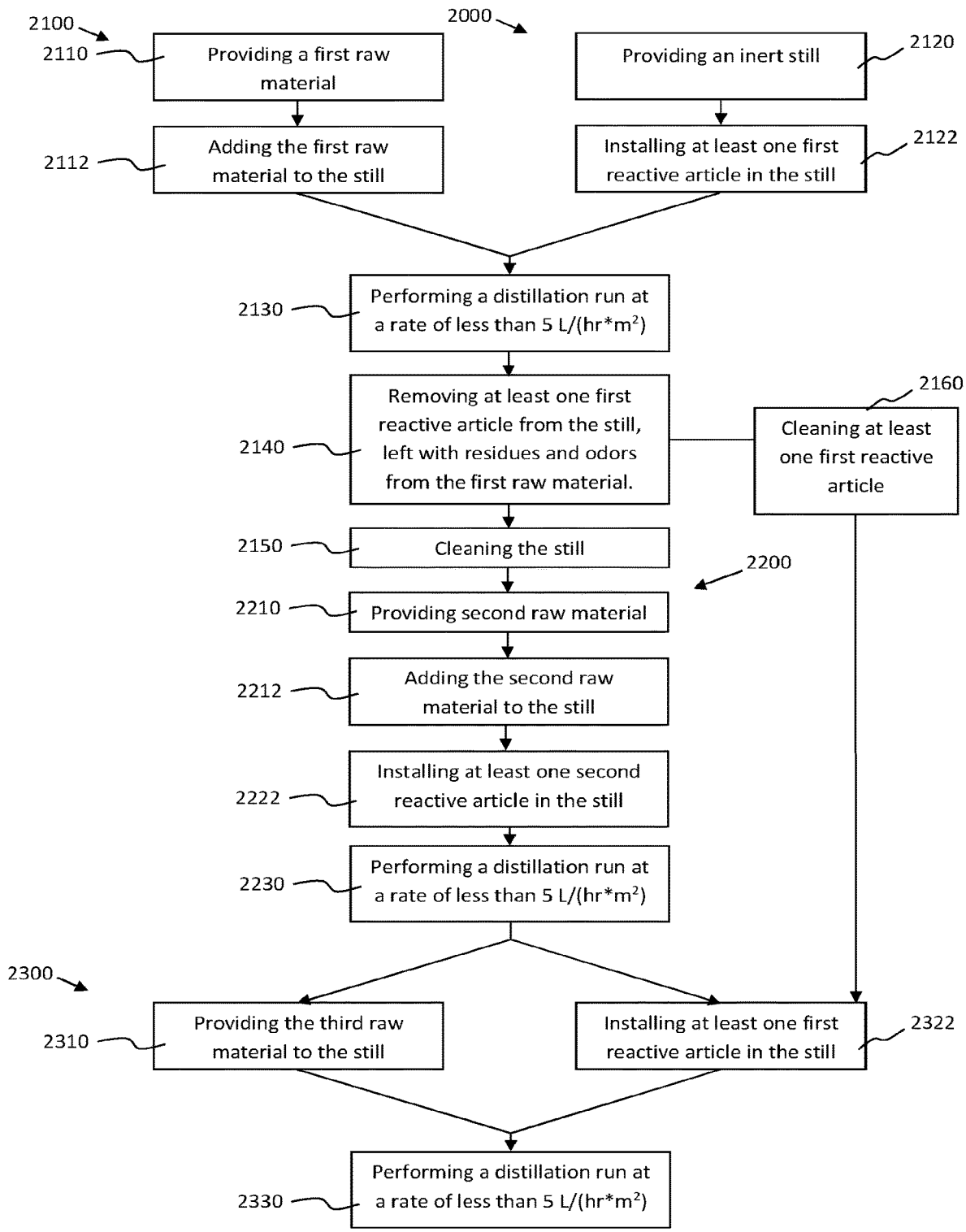
FIG. 11 illustrates an example of a method of distillation.

An exemplary method 2000 is illustrated in block diagram form in FIG. 11.

A first distillation run 2100 comprises: providing an inert still 2120; providing a first raw material 2110; adding the first raw material to the still 2112; installing at least one first reactive article in the still 2122; performing a distillation run at a rate of less than 5 L/(hr*m$^2$) first raw material per exposed area of the at least one first article; removing at least one first reactive article from the still, left with residues and odors from the first raw material; cleaning the still 2150, and cleaning at least one first reactive article (removed from the still) 2160.

A second (consecutive) distillation run 2200 on the same still comprises: Providing second raw material 2210; Adding the second raw material to the still 2212; installing at least one second reactive article to the still 2222; and performing a distillation run at a rate of less than 5 L/(hr*m$^2$) second raw material per exposed area of the at least one second article. In some embodiments the cleaning can be repeated of the still and/or articles.

At this stage the cleaned first articles are ready to be reused. A third (consecutive) distillation run 2300 on the same still thus comprises: Providing third raw material to the still 2310; Installing at least one first reactive article in the still 2322, and performing a distillation run at a rate of less than 5 L/(hr*m$^2$) third raw material per exposed area of the at least one first article. The distillations can be repeated in perpetuum in various similar scenarios, e.g. during the third distillation second reactive articles can be cleaned and used for a fourth distillation.

As indicated above, the distillation should be sufficiently slow for all the kit variations.

Some kit embodiments further comprise spacers that are high-temperature and optionally electrically isolating (when required as explained above). The spacers are configured to allow the reactive articles to be engaged with the still without any direct contact with the still. Each kit may comprise sets of articles and spacers, wherein each set comprises at least one article and one spacer, the set spacer particularly configured to allow removable engagement of the set article to the still.

Thus, a still in accordance with the disclosure is substantially made of durable material such as stainless steel which does not react with the wash nor with the distillate, for example wash when making whiskey or the wine when making brandy, and has one or more internal pieces or articles made of a reactive material, which do provide such reaction. One or more of the reactive articles may be removable or replaceable such that beverages of varying tastes may be produced, depending on the amount and structure of the reactive articles. Optionally, the reactive articles are isolated from the non reactive components in order to avoid galvanic corrosion. Although the description above has related to a still i.e. a distillation system for production of beverages of high alcohol content, actually other processes and systems can be adapted according to the embodiments described herein, for example distillation of crude oil similarly involves removal of sulfur-containing compounds from the distillate; production of fuel from coal involves scrubbing sulfur containing compounds in the smoke stacks and elsewhere in the process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to articles in a list with which the words may be associated. In addition, where there are inconsistencies between this application and any document incorporated by reference, it is hereby intended that the present application controls.

What is claimed:

1. A method of batch distilling comprising:
   providing a first substrate that upon distillation releases vapour comprising deleterious sulfur compounds;
   providing an inert still comprising a pot;
   adding the first substrate to the pot;
   installing at least one first reactive article in the still, and subsequently performing a distillation run on the first substrate such that the installed at least one first article has a first exposed area that is exposed to the distillate; and
   collecting a first desired fraction during the distillation, wherein the first reactive article is made of copper;
   wherein the distillation during the collection of the first desired fraction is performed at a rate less than 5 L/(hr*m$^2$) of first substrate per first exposed area, whereby the deleterious sulfur compounds are reduced in the collected first fraction to a desirable level, and
   wherein while collecting the first desired fraction of the first exposed area is at least 5.5 m$^2$ reacting area for every 1 m$^2$ of the first substrate surface area in the pot.

2. The method of claim 1, further comprising:
subsequent to collecting distillate from the distillation run: disengaging the at least one first removable reactive article from the still,
providing a second substrate;
adding the second substrate to the still, and
subsequently performing a second distillation run on the second substrate.

3. The method of claim 2, further comprising:
cleaning the at least one first removable article while performing the second distillation run.

4. The method of claim 3,
wherein the second substrate upon distillation releases vapour comprising deleterious sulfur compounds;
the method further comprising:
installing at least one second reactive article in the still, and
subsequently performing a distillation run on the second substrate, such that the installed at least one second article has a second exposed area that is exposed to the distillate;
collecting a second desired fraction from the second distillation run;
wherein the distillation during the collection of the second desired fraction is performed at a rate of less than 5 L/(hr*m$^2$) of second desired fraction per second exposed area,
whereby the deleterious sulfur compounds are reduced in the collected desired fraction to a desirable level.

5. The method of claim 1, wherein the inert still comprises stainless steel.

6. The method of claim 1, wherein the deleterious sulfur compounds comprise DMTS.

7. The method of claim 1, wherein the first fraction is of an alcoholic beverage.

8. The method of claim 3,
wherein the second substrate upon distillation releases vapour comprising deleterious sulfur compounds;
the method further comprising:
installing at least one second reactive article in the still, and
subsequently performing a distillation run on the second substrate, such that the installed at least one second article has a second exposed area that is exposed to the distillate;
collecting a second desired fraction from the second distillation run;
wherein the second reactive article is made of copper; and while collecting the second desired fraction the second exposed area is at least 5.5 m$^2$ for every 1 m$^2$ of the second substrate surface area in the pot.

* * * * *